(12) United States Patent
Segura et al.

(10) Patent No.: US 6,360,076 B1
(45) Date of Patent: Mar. 19, 2002

(54) METHOD OF BROADCASTING A QUALITY OVER-THE-AIR MULTICAST

(75) Inventors: Louis Segura, St.-Laurent; David Sugirtharaj; Samy Touati, both of Montreal, all of (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/413,580

(22) Filed: Oct. 6, 1999

(51) Int. Cl.[7] ............................................... H04B 17/00
(52) U.S. Cl. ....................... 455/67.1; 370/335; 370/230; 370/232; 370/233; 455/518; 455/520; 455/67.1; 455/67.4; 455/416; 455/417
(58) Field of Search ................................ 455/518, 520, 455/67.1, 67.4, 416, 417; 370/332, 230, 232, 233, 235

(56) References Cited

U.S. PATENT DOCUMENTS

| | | | | |
|---|---|---|---|---|
| 6,104,709 A | * | 8/2000 | Rinchuiso et al. | 370/335 |
| 6,104,712 A | * | 8/2000 | Robert et al. | 370/389 |
| 6,236,365 B1 | * | 5/2001 | LeBlanc et al. | 342/457 |

* cited by examiner

*Primary Examiner*—Lee Nguyen
*Assistant Examiner*—Danh Le
(74) *Attorney, Agent, or Firm*—Smith, Danamraj & Youst, P.C.

(57) ABSTRACT

A method in a radio telecommunications network of broadcasting data in an over-the-air multicast to a group of mobile terminals. Statistics from regular point-to-point cellular transmissions to build a statistical database for each base station. The statistical data indicate the optimal signal quality that users normally experience when operating in that cell. From this data, a minimum transmission quality (TQmin) that a mobile terminal must receive for the type of data being broadcast is determined. The method then broadcasts a test transmission to the mobile terminals, and includes a maximum transmission quality (TQmax) in order to limit the number of responses. A response is then received from a mobile terminal representative of the group, the response including an indication of the received transmission quality. The method then determines whether the received transmission quality was greater than or equal to TQmin. If the received transmission quality was greater than or equal to TQmin, the data is broadcast in the over-the-air multicast to the group of mobile terminals.

9 Claims, 5 Drawing Sheets

METHOD OF BROADCASTING A QUALITY OVER-THE-AIR MULTICAST

BACKGROUND OF THE INVENTION

1. Technical Field of the Invention

This invention relates to telecommunication systems and, more particularly, to a method of broadcasting a quality over-the-air multicast to a plurality of mobile terminals.

2. Description of Related Art

Multicasts are useful whenever there is a group of subscribers with a common interest, and information of interest to the group can be broadcast to the group in single transmission. For example, at a sporting event, multiple spectators with mobile terminals such as Personal Digital Assistants (PDAs) may desire to receive a broadcast of highlights or game statistics. The same data may be simultaneously transmitted in a broadcast transmission to all users, and no response is needed from the mobile terminals. The multicast process uses only one downlink channel, and no uplink channels, while leaving other channels in the network available for other users. Billing may be set up as a flat fee for a particular broadcast. The broadcast may be encrypted, or require the entry of a code to ensure that only subscribers who have signed up for the broadcast are able to receive it. In the Global System for Mobile Communications (GSM), a key can be set on the SIM card enabling the mobile terminal to receive the multicast.

Multicasting is efficient and uses minimal resources at the time of transmission, but the Quality of Service (QoS) (i.e., transmission quality) is dependent on the bearer. Multicast protocols are implemented at higher network layers that do not consider the transport media during the transmission, and the system operator does not know during the multicast whether the multicast is being received by the mobile terminals with sufficient transmission quality for the type of data being transmitted. Point-to-point unicasts, on the other hand, can ensure delivery by requiring an acknowledgment by the receiver. This approach works well in wired networks where the probability of packet losses is low. When a wireless network relays multicast packets over the air, however, the probability of packet loss is considerably higher. To compensate, data networks such as the General Packet Radio Service (GPRS) transfer the multicast packets to each wireless terminal as a point-to-point unicast packet. The Group Call Service (PTM-G), for example, which is defined in the GPRS standard within GSM, takes multicast inputs from reliable sources such as a corporate LAN (e.g., wired Ethernet) and sends them to wireless GPRS receivers as point-to-point unicasts. To achieve this, PTM-G uses a list of individual receivers that subscribe to a multicast transmission, and transmits a copy of the data individually to each receiver. An acknowledgment is sent from each receiver to the network. This type of transmission is not well suited for real-time, high-bandwidth transmissions since it utilizes re-transmissions at the radio link layer. Additionally, the method does not scale well when the number of receivers of the multicast service increases, and may require a substantial amount of network resources.

Alternatively, it is recognized that packets could simply be broadcast in area of cellular coverage without any acknowledgments from the receivers, hence without any guarantee of delivery. The problem with this approach is that the multicast service is a billable service, and a mechanism to measure and adjust transmissions according to the QoS delivered is essential.

Additionally, it should be noted that in GPRS, like most other networks, mobile terminals may have different capabilities in terms of the bandwidth that they support and their ability to support current applications. Current multicast procedures do not fully consider differing mobile terminal classes and their capabilities.

In order to overcome the disadvantage of existing solutions, it would be advantageous to have a method of broadcasting a quality over-the-air multicast to a plurality of mobile terminals. The method should scale well when the number of receivers of the multicast service increases, should consider differing mobile terminal classes and their capabilities, and should allow the system operator to measure and adjust transmissions according to the QoS delivered, while not requiring that acknowledgments be received from each mobile terminal receiving the multicast. The present invention provides such a method.

SUMMARY OF THE INVENTION

In one aspect, the present invention is a method in a radio telecommunications network of broadcasting data in an over-the-air multicast to a group of mobile terminals. The method begins by determining a minimum transmission quality (TQmin) that a mobile terminal must receive for the type of data being broadcast, broadcasting a test transmission to the mobile terminals, and receiving a response from a mobile terminal representative of the group. The response includes an indication of the received transmission quality, and the method then determines whether the received transmission quality was greater than or equal to TQmin. If the received transmission quality was greater than or equal to TQmin, the data is broadcast in the over-the-air multicast to the group of mobile terminals.

In another aspect, the present invention is a method of broadcasting data in an over-the-air multicast to a group of mobile terminals which includes the steps of determining a minimum transmission quality (TQmin) that a mobile terminal must receive for the type of data being broadcast, and broadcasting a test transmission to the mobile terminals, the test transmission including a maximum transmission quality threshold (TQmax). The mobile terminals are instructed not to respond to the test transmission if their received transmission quality is above TQmax. This is followed by starting a response timer, and receiving a response from a mobile terminal representative of the group, the response including an indication of the received transmission quality. The method then determines whether the received transmission quality was greater than or equal to TQmin. If not, and the response timer has expired, TQmin is decreased and the test transmission is re-broadcast to the mobile terminals with the decreased TQmin. If the received transmission quality was greater than or equal to TQmin, however, the method broadcasts the data in the over-the-air multicast to the group of mobile terminals.

In yet another aspect, the present invention is a method of broadcasting data in an over-the-air multicast to a group of mobile terminals which includes the steps of determining a minimum transmission quality (TQmin) that a mobile terminal must receive for the type of data being broadcast, and broadcasting a test transmission to the mobile terminals, the test transmission including a maximum transmission quality threshold (TQmax). The mobile terminals are instructed not to respond to the test transmission if their received transmission quality is above TQmax. This is followed by receiving a response from a plurality of mobile terminals in the group, each response including an indication of the received transmission quality for the mobile terminal transmitting the response, and determining whether the received transmission quality was greater than or equal to TQmin for each of the received responses. If the received transmission quality was greater than or equal to TQmin for a predefined threshold number of the received responses, the data is broadcast in the over-the-air multicast to the group of mobile terminals.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention determines a downlink transmission mode for use in a multicast broadcast that is the most efficient mode and has the highest probability of reaching a specific group of mobile terminals that are the intended receivers. The method is utilized prior to the multicast transmission of the payload to tune the transmission for the best delivery to all of the receiving subscribers. The invention adapts the broadcast based upon the capabilities of the receivers of the multicast while specifying a minimum broadcast quality. The preferred embodiment of the present invention is described below in terms of the General Packet Radio Service (GPRS).

Without the present invention, when an operator has a need to push data to a group of subscribers, the operator may attempt to send the data, but has no way of knowing what bit rate to use. Most likely, the operator will send the data at the optimum bit rate to produce the best transmission quality. But in any transmission of data, there are thresholds which define poor, medium, and good quality, and for any given transmission, a less than optimum transmission quality may be sufficient. The present invention enables the operator to transmit at less than optimum quality and determine that there are mobile terminals that can receive it.

When a multicast is targeted toward a group of subscribers in a cell, the inventive method applies defined QoS criteria and extracts one response from a representative member of the group. This maximizes the probability of a multicast packet arriving error free at all of the members of the group without requiring a response from each individual mobile terminal. The proper representative member must be identified to ensure that there is a high probability that all of the members receive the multicast transmission. Once the network has received a response, the group is informed of this fact so that no other mobile terminals respond.

Figure 1:
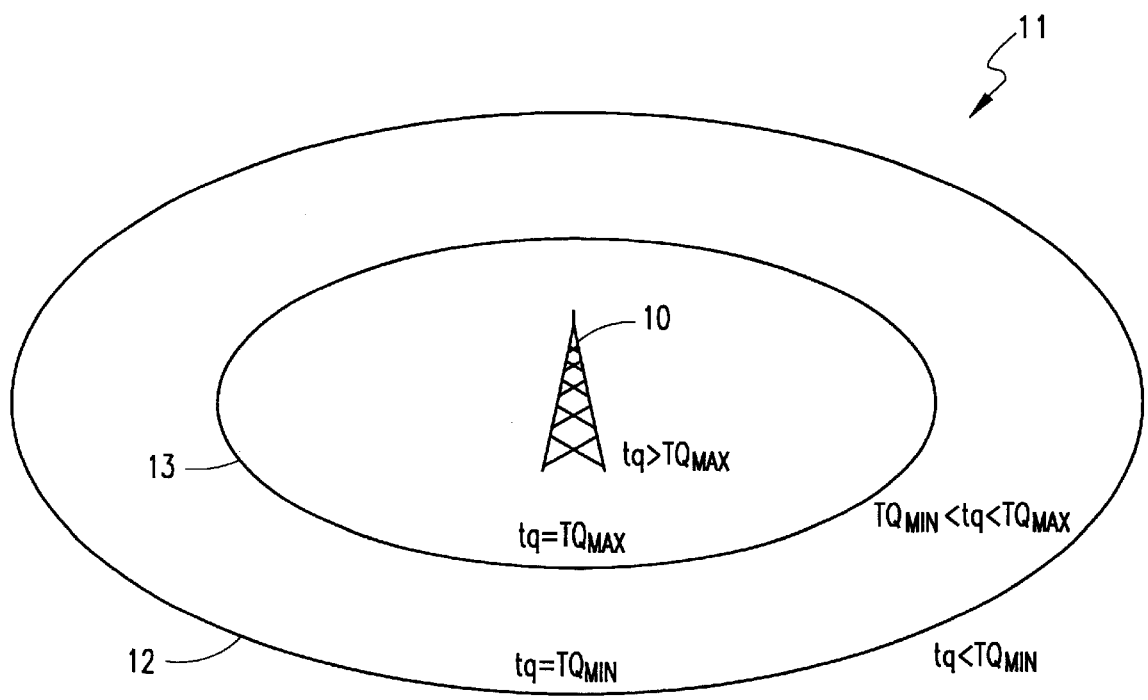
FIG. 1 is an illustrative drawing of a cellular service area surrounding a base station, and illustrating an area to be serviced by a multicast from the base station.

FIG. 1 is an illustrative drawing of a cellular service area surrounding a base station 10, and illustrating an area 11 to be serviced by a multicast from the base station. An outer border 12 of the multicast area is defined by a minimum transmission quality (TQmin) that is required to deliver a particular broadcast service. TQmin can vary due to the content of the transmission which may contain data that are sensitive to loss such as software, images, text strains, etc., or may contain data that are more tolerant to loss such as audio or video.

Statistical data for the cell are collected from regular point-to-point cellular transmissions to build a database for each base station. The statistical data indicate the optimal signal quality that users normally experience when operating in that cell. Based on that signal quality, TQmin can be determined for a specific data content (for example, an audio stream). If TQmin is 3 of 5 time slots, for example, a test broadcast is transmitted requesting mobile terminals having a received transmission quality (tq) of 3 of 5 to respond.

The method also adapts the network to account for varying QoS levels. If most of the mobile terminals are close to the base station 10, the quality thresholds may be increased, along with the bit rate as well. However, if most of the mobile terminals in the group move farther away from the base station, the quality thresholds may be decreased. The threshold ranges in the query are selected based on the statistical data.

An inner border 13 of the multicast area is defined by the maximum transmission quality (TQmax) which is defined to prevent mobile terminals that measure transmission qualities well above TQmin from flooding the network with responses. In addition, the maximum quality level is defined because any response with a reported tq above that level would not be useful since it is probably not a fair representation of the group. TQmin and TQmax are defined and then broadcast to the group in a test broadcast. When the first response is received by the base station with a reported tq in the range of TQmin<tq<TQmax, the other mobile terminals are notified by the base station not to respond.

The present invention solves the problem in existing systems in which the base station must receive an acknowledgment from each mobile terminal. This saves on the uplink traffic and processing at the base station. In a regular point-to-point cellular connection from a provider to a mobile terminal, there is both a downlink connection and an uplink connection which carry signal strength information. This is not true for a multicast in which there is only a downlink connection. The method of the present invention provides a statistical sampling in order to increase the probability that all members of the group are getting good reception.

The service area for the multicast may be smaller than the area covered by the cell. Mobile terminals at the edge of the multicast service area may be utilized as reference mobile terminals to control the transmission quality. In this way, mobile terminals located in areas outside the desired multicast area cannot receive the multicast transmission.

If the first iteration of the method does not yield conclusive results, the method may be repeated using a wider range between TQmin and TQmax, or by increasing the transmission quality of the test broadcast. Different QoS thresholds may be set, depending on the type of information that is being transmitted. Different encoding schemes are used for voice, data, and video, for example. So depending on the type of data being transmitted, there is a minimum threshold encoding scheme that is required to guarantee that the data can be sent, and a minimum transmission quality that the response must exceed.

Figure 2:
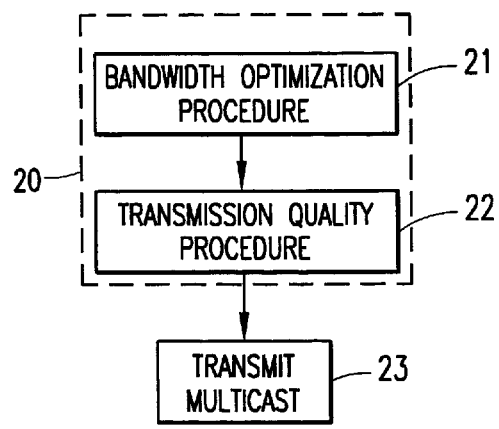
FIG. 2 is a simplified flow chart illustrating the relationship of an inventive multicast quality procedure with a multicast broadcast.

FIG. 2 is a simplified flow chart illustrating the relationship of an inventive multicast quality procedure 20 with a multicast broadcast. The multicast quality procedure comprises a bandwidth optimization procedure 21 and a transmission quality procedure 22. The purpose of the bandwidth optimization procedure is to determine what bandwidth should be allocated to the multicast transmission, and to specify TQmin and TQmax. The bandwidth allocated to a multicast service may be influenced by the current traffic in the system, the minimum bandwidth required by the multicast transmission, and the capability of the mobile terminals that are interested in receiving the multicast transmission. Since the time slots allocated to a service can range from one to eight in GPRS, the bandwidth may vary from 14 kbs to 115 kbs. In principle, the minimum multicast service requirement and the amount of bandwidth a network operator may allocate to a multicast transmission determine the minimum and maximum number of time slots that can be allocated to the multicast transmission. In actuality, the mobile terminal classes in the receiving group, as determined by the method of this invention, determine the actual number of time slots used for the multicast transmission.

In the bandwidth optimization procedure, the transmission quality in a given cell is evaluated by sending out test packets on the broadcast channel. The test packets are sent using a downlink transmission method that assumes ideal conditions over the link, i.e., one time slot, minimal coding, etc. The transmission specifies the minimum required bandwidth required for this transmission. The bandwidth optimization procedure is described in more detail below in connection with FIG. 3.

At step 22, the transmission quality procedure is performed to obtain a response from a representative mobile terminal. The purpose of the transmission quality procedure is to enhance the true multicast model, that is, send only one packet to many users. The procedure measures the quality of the multicast transmission from the perspective of the mobile terminal (end user), and adjusts layer 1 (physical) and layer 2 (link) parameters. In the wireless context, the transmission quality can be measured in terms of signal strength and bit error rate (BER).

In the transmission quality procedure, the transmission quality in a given cell is evaluated by sending out test packets on the broadcast channel. The test packets are sent using a downlink transmission method that assumes ideal conditions over the link, i.e., minimal coding, etc. The test packets also specify a maximum transmission quality, TQmax. The mobile terminals that are camped on the cell where the broadcast transmission is being sent, and which are interested in receiving the particular broadcast service that is associated with the test packets, ensure that they are able to receive the transmission with a specified level of quality, TQmin. If the received signal quality for a particular mobile terminal is above TQmax, the mobile terminal is not eligible to reply since it is probable that it is located close to the base station and hence is not representative of mobile terminals near the edge of the cell/service coverage.

All mobile terminals with received transmission quality (tq) less than TQmax start replying to the network with their tq. When a tq is received in the base station that equals the TQmin of the broadcast service, an order is broadcast to the mobile terminals to stop sending any more tq measurements. If, within a given time window, the base station does not receive a response indicating that a mobile terminal is receiving the test packet at tq$\geq$TQmin, the required downlink tq is downgraded, and the multicast quality procedure is repeated. The transmission quality procedure is described in more detail below in connection with FIG. 3.

The results of the bandwidth optimization procedure 21 and the transmission quality procedure 22 are then utilized at step 23 to transmit the multicast. In this embodiment of the present invention, the bandwidth optimization and transmission quality procedures are not repeated for the duration of the multicast. This embodiment may be utilized when multicasting to users who are relatively stationary, such as spectators at a sporting event or a concert.

Figure 3:
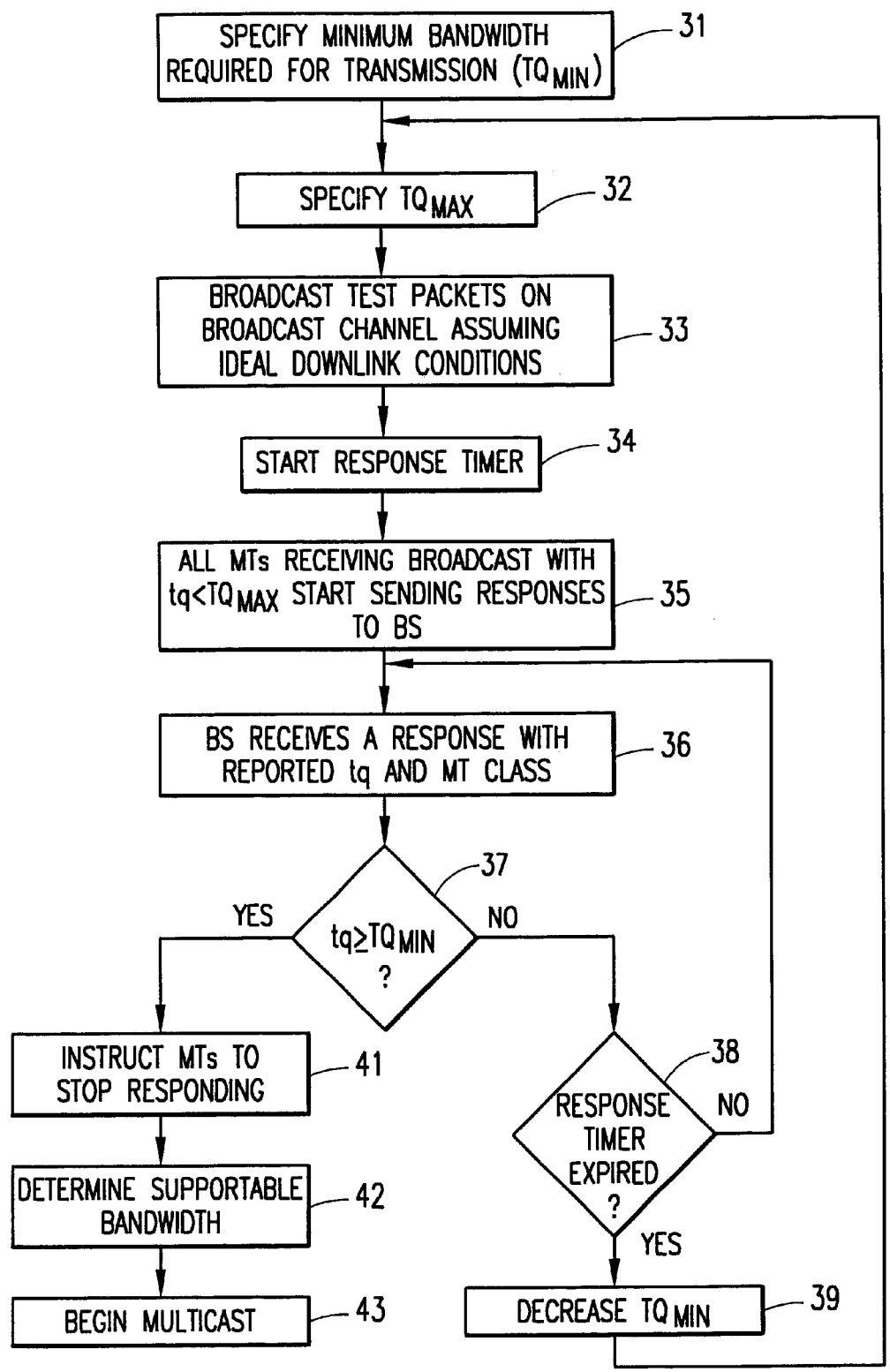
FIG. 3 is a flow chart illustrating the steps of the preferred embodiment of the multicast quality procedure of the present invention.

FIG. 3 is a flow chart illustrating the steps of the preferred embodiment of the multicast quality procedure 20 of FIG. 2. At step 31, the system operator specifies TQmin, the minimum bandwidth required for the type of data to be transmitted in the multicast. As noted above, the operator may determine TQmin from statistical data for the cell collected from regular point-to-point cellular transmissions of the same type of data to be transmitted in the multicast. At 32, TQmax is specified. At 33, test packets are broadcast on the broadcast channel utilizing a method which assumes ideal downlink conditions. The test packets identify TQmin and TQmax, and mobile terminals which receive the test packets with a transmission quality (tq) in the range of TQmin to TQmax are instructed to respond.

A response timer is then started at step 34. The response timer handles the situation in which the test packets are broadcast, but there are no mobile terminals reporting a tq in the specified range. They may be located, for example, too far from the base station, and receive the signal with a quality of less than TQmin, or they may be located too close to the base station, and receive the signal with a quality greater than TQmax. The response timer is used to measure a response period, at the expiration of which, the network stops listening for responses. Therefore, when the timer expires, it is known that no mobile terminals in the cell can receive the signal within the specified transmission quality range.

At step 35, all mobile terminals receiving the broadcast with a tq less than TQmax start sending responses to the base station 10. The responses include the received tq and the mobile terminal class. GPRS has different classes of mobile terminals, therefore, the multicast may be going to mobile terminals having different capabilities. The present invention enables the operator to take advantage of these classes when broadcasting a multicast. The mobile terminal class is indicated in the response, and identifies whether the responding mobile terminal is multi-slotted, and the reception capability of the responding mobile terminal.

At step 36, the base station 10 receives a response with the reported tq and mobile terminal class. At 37, it is determined whether or not the reported tq is greater than or equal to TQmin. If not, the process moves to step 38 where it is determined whether or not the response timer has expired. If not, the process returns to step 36 where the base station continues to receive responses from the mobile terminals. If the response timer expires at 38, then there were no mobile terminals which were receiving the transmission with a tq greater than or equal to TQmin. Therefore, at step 39 TQmin is decreased, and the process returns to step 32 and begins the test sequence again. TQmax may also be adjusted at step 32 to increase the specified range between TQmax and TQmin.

If it is determined at step 37, however, that a response has been received with a reported tq greater than or equal to TQmin, the process moves to step 41 where the system instructs the remaining mobile terminals to stop responding. The intent is to receive one acknowledgment from the first eligible mobile terminal that has received the test packets successfully. When this acknowledgment is received, it implies that an acceptable transmission quality has been achieved. This result is then re-broadcast in the cell to prevent any more responses from other mobile terminals, thereby reducing the load on the network.

The method then determines the bandwidth that can be supported by the mobile terminal and the air interface at 42. At step 43, transmission of the multicast is begun. A GPRS broadcast may fill from one to eight time slots. If all of the mobile terminals are capable of receiving 4 of 8 time slots, the operator can start broadcasting at 4 time slots. If the operator is transmitting video, and sets 4 time slots as a minimum, then mobile terminals that can only operate below 4 are not of interest. If some mobile terminals can receive at 4 time slots and others at 8 time slots, the operator will probably transmit at 4 time slots to ensure that the maximum number of users receive the data. Higher data rates are preferable, however, so if the method reveals that all of the mobile terminals are capable of receiving at 8 time slots, then the operator would probably broadcast at 8 time slots.

Figure 4:
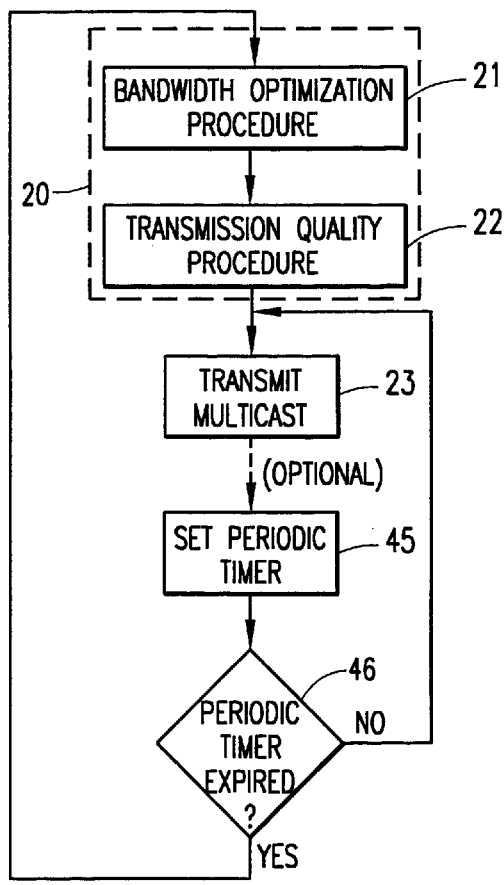
FIG. 4 is a simplified flow chart illustrating an alternative embodiment of the method of the present invention.

FIG. 4 is a simplified flow chart illustrating an alternative embodiment of the method of the present invention. In this embodiment, the multicast quality procedure 20 may be re-broadcast periodically to ensure that the targeted mobile terminals are still receiving the multicast, and any mobile terminal meeting the reception criteria may respond. This embodiment may be useful when the targeted mobile terminals are moving over a wider area, and therefore may experience greater variation in their received tq. The use of this embodiment may depend on system capacity and the type of data being transmitted since system resources are utilized to perform the multicast quality procedure.

At step 21, the bandwidth optimization procedure is performed. The transmission quality procedure is performed at 22, and the results of these procedures are then utilized at step 23 to transmit the multicast. Optionally, the operator may set a periodic timer at step 45. When it is determined at step 46 that the timer has expired, the process returns to step 21 and repeats the bandwidth optimization procedure and the transmission quality procedure.

Figure 5:
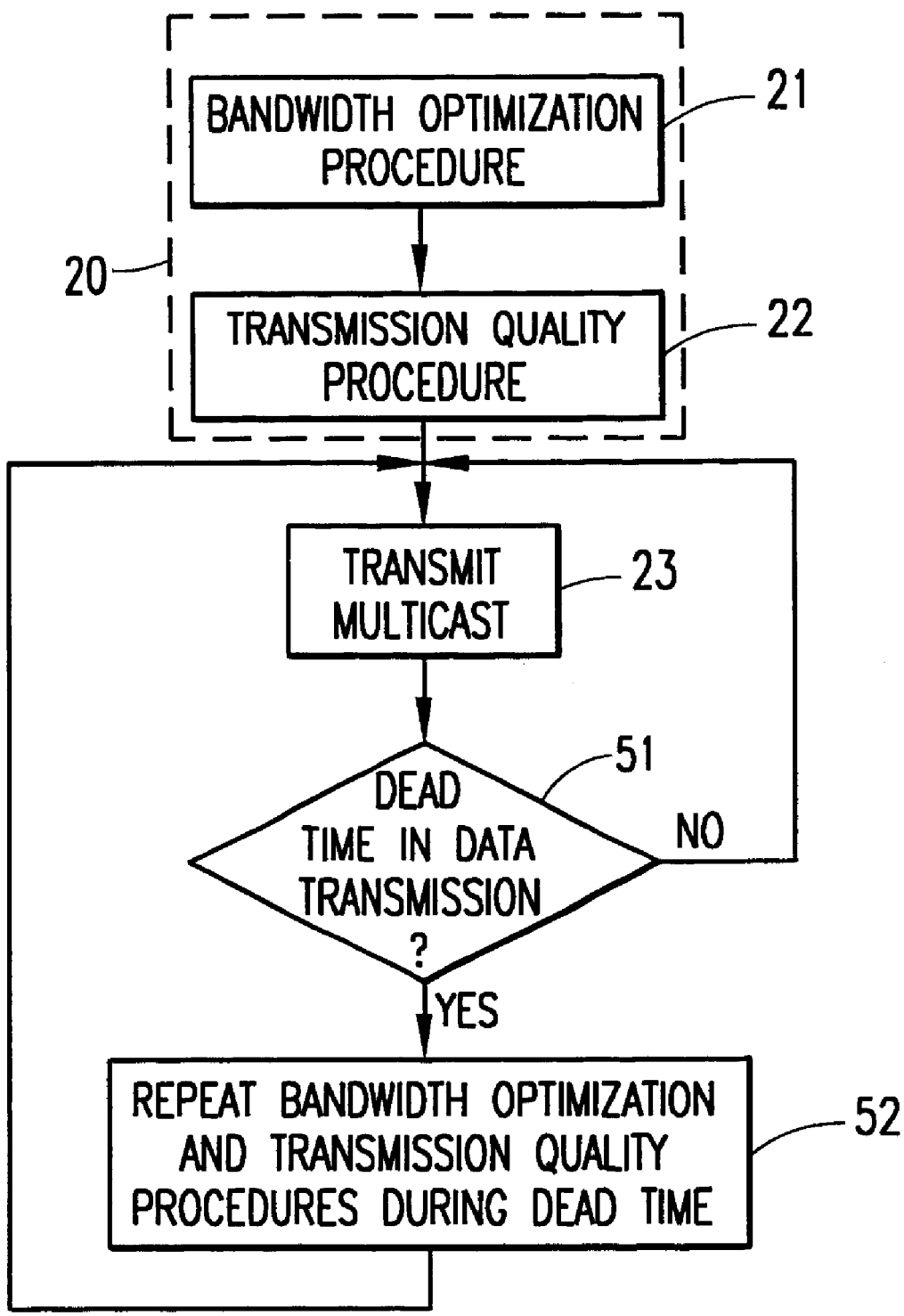
FIG. 5 is a simplified flow chart illustrating another alternative embodiment of the method of the present invention.

FIG. 5 is a simplified flow chart illustrating another alternative embodiment of the method of the present invention. For certain types of data, the transmission quality procedure may be broadcast during dead time when there is no data being transmitted. In this embodiment, the bandwidth optimization procedure is performed at step 21, and the transmission quality procedure is performed at 22. The results of these procedures are then utilized at step 23 to transmit the multicast. If it is determined at step 51 that there is dead time in the data transmission, the operator may choose to repeat the transmission quality procedure during the dead time at step 52. Transmission of the multicast then continues at step 23.

Figure 6:
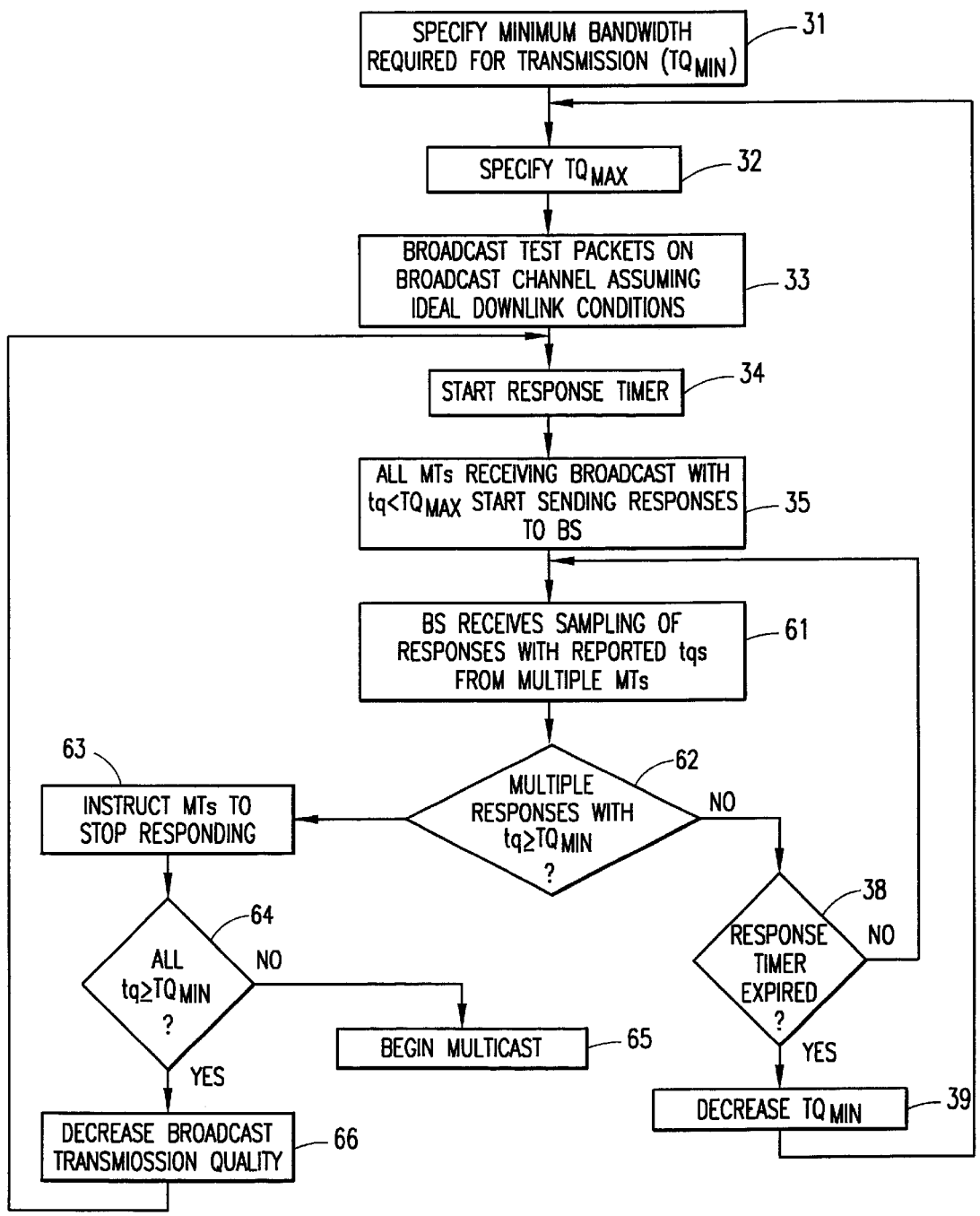
FIG. 6 is a flow chart illustrating the steps of an alternative embodiment of the multicast quality procedure of the present invention.

FIG. 6 is a flow chart illustrating the steps of an alternative embodiment of the multicast quality procedure of the present invention. In this embodiment, the operator may allow more than one mobile terminal to respond in order to get a sampling and ensure that multiple mobile terminals can receive at the minimum quality level. This embodiment may be utilized when the network is lightly loaded. In a crowded network, however, the operator may not want to utilize system resources for multiple responses, and may ask for a response from only a single mobile terminal that can receive at a specified QoS, as shown in FIG. 3. This embodiment also illustrates an escalation algorithm that decreases transmission quality if all of the mobile terminals are receiving the transmission. A subsequent test transmission is then made with lower transmission quality to see if there is still an adequate response.

The method begins as shown in FIG. 3, and like steps have been given the same reference numerals. At step 31, the system operator specifies TQmin, the minimum bandwidth required for the type of data to be transmitted in the multicast. At 32, TQmax is specified. At 33, test packets are broadcast on the broadcast channel utilizing a method which assumes ideal downlink conditions. The test packets identify TQmin and TQmax, and mobile terminals which receive the test packets with a transmission quality (tq) in the range of TQmin to TQmax are instructed to respond.

The response timer is then started at step 34. At step 35, all mobile terminals receiving the broadcast with a tq less than TQmax start sending responses to the base station 10. The responses include the received tq and the mobile terminal class. At step 61, the base station receives a sampling of responses with reported tqs and mobile terminal classes from a plurality of mobile terminals. At 62, it is determined whether or not multiple responses have been received in which the reported tq is greater than or equal to TQmin. If not, the process moves to step 38 where it is determined whether or not the response timer has expired. If not, the process returns to step 61 where the base station continues to receive responses from the mobile terminals. If the response timer expires at 38, then the process moves to step 39 where TQmin is decreased, and the process returns to step 32 and begins the test sequence again. TQmax may also be adjusted at step 32 to increase the specified range between TQmax and TQmin.

However, if it is determined at step 62 that multiple responses have been received in which the reported tq is greater than or equal to TQmin, the process moves to step 63 where the system instructs the remaining mobile terminals to stop responding. The process then moves to step 64 where it is determined whether or not all of the responses had reported tqs greater than or equal to TQmin. If not, the multicast begins at step 65. Alternatively, the operator may specify that the multicast begin if tq is greater than or equal to TQmin for a predefined threshold number of the received responses. If all of the responses had reported tqs greater than or equal to TQmin, however, the broadcast transmission quality may be downgraded at step 66 to conserve network resources, and the process returns to step 34.

Various parameters may be adjusted in the downlink towards the mobile terminal to decrease the transmission quality. The parameters include channel coding, power control, spreading factor, etc. Actual radio parameters that can be changed vary from network to network. For channel coding, there are various MPEG coding schemes that are suitable for different situations. MPEG-4, for example, would be the choice for coding multimedia when only low data rates can be achieved over the air interface. Other examples of codecs that could be used include H261, H263, and RealVideo. The parameters that can be controlled on the downlink are dependent on the particular radio interface, for instance GPRS, EDGE, or Wideband CDMA. The transmission quality measurement would also depend on the radio interface.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. In a radio telecommunications network, a method of broadcasting data in an over-the-air multicast to a group of mobile terminals, said method comprising the steps of:

determining a minimum transmission quality (TQmin) that a mobile terminal must receive for the type of data being broadcast;

broadcasting a test transmission to the mobile terminals;

receiving a response from a mobile terminal representative of the group, the response including an indication of the received transmission quality;

determining whether the received transmission quality was greater than or equal to TQmin; and broadcasting the data in the over-the-air multicast to the group of mobile terminals, upon determining that the received transmission quality was greater than or equal to TQmin.

2. The method of broadcasting data in an over-the-air multicast of claim 1 further comprising the steps of:

defining a maximum transmission quality threshold (TQmax);

including TQmax in the test transmission to the mobile terminals; and instructing the mobile terminals not to respond to the test transmission if their received transmission quality is above TQmax.

3. The method of broadcasting data in an over-the-air multicast of claim 1 further comprising the steps of:

starting a response timer after broadcasting the test transmission to the mobile terminals;

determining whether the response timer has expired, upon determining that the received transmission quality was less than TQmin;

decreasing TQmin, upon determining that the response timer has expired; and re-broadcasting the test transmission to the mobile terminals.

4. The method of broadcasting data in an over-the-air multicast of claim 1 further comprising periodically re-broadcasting the test transmission to the mobile terminals during the multicast.

5. The method of broadcasting data in an over-the-air multicast of claim 1 further comprising the steps of:

determining whether dead time exists in the type of data being transmitted; and re-broadcasting the test transmission to the mobile terminals during the dead time.

6. The method of broadcasting data in an over-the-air multicast of claim 1 wherein the response also includes an indication of the responding mobile terminal's class, and the method further comprises, after determining that the received transmission quality was greater than or equal to TQmin, the steps of:

instructing all other mobile terminals in the group to stop responding; and determining a supportable bandwidth for the multicast from the received transmission quality and the mobile terminal class in the response.

7. In a radio telecommunications network, a method of broadcasting data in an over-the-air multicast to a group of mobile terminals, said method comprising the steps of:

determining a minimum transmission quality (TQmin) that a mobile terminal must receive for the type of data being broadcast;

broadcasting a test transmission to the mobile terminals, said test transmission including a maximum transmission quality threshold (TQmax);

instructing the mobile terminals not to respond to the test transmission if their received transmission quality is above TQmax;

receiving a response from a plurality of mobile terminals in the group, each response including an indication of the received transmission quality for the mobile terminal transmitting the response;

determining whether the received transmission quality was greater than or equal to TQmin for each of the received responses; and broadcasting the data in the over-the-air multicast to the group of mobile terminals, upon determining that the received transmission quality was greater than or equal to TQmin for a predefined threshold number of the received responses.

8. The method of broadcasting data in an over-the-air multicast of claim 7 further comprising the steps of:

downgrading the transmission quality of the test transmission, upon determining that the received transmission quality was greater than or equal to TQmin for all of the received responses; and re-broadcasting the test transmission at a downgraded transmission quality.

9. In a radio telecommunications network, a method of broadcasting data in an over-the-air multicast to a group of mobile terminals, said method comprising the steps of:

determining a minimum transmission quality (TQmin) that a mobile terminal must receive for the type of data being broadcast;

broadcasting a test transmission to the mobile terminals, said test transmission including a maximum transmission quality threshold (TQmax);

instructing the mobile terminals not to respond to the test transmission if their received transmission quality is above TQmax;

starting a response timer;

receiving a response from a mobile terminal representative of the group, the response including an indication of the received transmission quality;

determining whether the received transmission quality was greater than or equal to TQmin;

determining whether the response timer has expired, upon determining that the received transmission quality was less than TQmin;

decreasing TQmin and re-broadcasting the test transmission to the mobile terminals with a decreased TQmin, upon determining that the response timer has expired; and broadcasting the data in the over-the-air multicast to the group of mobile terminals, upon determining that the received transmission quality was greater than or equal to TQmin.

* * * * *